(12) United States Patent
Cho

(10) Patent No.: US 9,423,620 B2
(45) Date of Patent: Aug. 23, 2016

(54) HEAD MOUNTED DISPLAY AND METHOD FOR CONTROLLING THE SAME

(71) Applicant: LG ELECTRONICS INC., Seoul (KR)

(72) Inventor: Eunhyung Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 41 days.

(21) Appl. No.: 14/341,243

(22) Filed: Jul. 25, 2014

(65) Prior Publication Data

US 2015/0309311 A1 Oct. 29, 2015

(30) Foreign Application Priority Data

Apr. 24, 2014 (KR) .......................... 10-2014-0049194

(51) Int. Cl.
*G09G 5/00* (2006.01)
*G02B 27/01* (2006.01)

(52) U.S. Cl.
CPC ........ *G02B 27/017* (2013.01); *G02B 2027/014* (2013.01); *G02B 2027/0178* (2013.01); *G02B 2027/0187* (2013.01)

(58) Field of Classification Search
CPC ............... G09G 2320/0261; G09G 2320/068; G09G 2320/028; G09G 2320/0613; G09G 2320/103; G09G 2380/10
USPC ......................................... 345/7–9
See application file for complete search history.

(56) References Cited

U.S. PATENT DOCUMENTS 7,312,766 B1 * 12/2007 Edwards .............. G02B 27/017 248/115
8,947,323 B1 * 2/2015 Raffle .................... G09G 3/001 345/156

(Continued)

FOREIGN PATENT DOCUMENTS

JP          2012-8290 A    1/2012
KR   10-2014-0010715 A    1/2014

*Primary Examiner* — Alexander Eisen
*Assistant Examiner* — Nelson Lam
(74) *Attorney, Agent, or Firm* — Birch, Stewart, Kolasch & Birch, LLP

(57) ABSTRACT

A head mounted display (HMD) configured to provide a surrounding image is disclosed. The HMD includes a display unit configured to display a section of the surrounding image corresponding to a front direction of the HMD, a first sensor group including at least one sensor configured to sense motion of the HMD, a second sensor group including at least one sensor provided to the HMD to capture a circumjacent image, and a processor configured to control the display unit, the first sensor group and the second sensor group to acquire first sensing information from the first sensor group and second sensing information from the second sensor group, wherein the processor detects a state of the HMD using at least one of the first sensing information and the second sensing information, the state of the HMD including a static state in which an absolute position of the HMD does not change and a moving state in which the absolute position changes, detects, when the state of the HMD is detected as the static state, a direction in which a front of the HMD faces based on the first sensing information or on the first sensing information and the second sensing information, detects, when the state of the HMD is detected as the moving state, the direction in which the front of the HMD faces based on the second sensing information or based on the second sensing information and the corrected first sensing information, and displays an image of a section of the surrounding image corresponding to the detected direction.

19 Claims, 11 Drawing Sheets

(56) References Cited

U.S. PATENT DOCUMENTS

| | | |
|---|---|---|
| 2007/0247457 A1* | 10/2007 | Gustafsson ............... F41G 1/00 345/420 |
| 2011/0250962 A1 | 10/2011 | Feiner et al. |
| 2012/0050138 A1* | 3/2012 | Sato ....................... B60K 35/00 345/4 |
| 2012/0256945 A1 | 10/2012 | Kidron et al. |
| 2013/0222428 A1 | 8/2013 | Mattila et al. |
| 2013/0222638 A1 | 8/2013 | Wheeler et al. |
| 2013/0257709 A1 | 10/2013 | Raffle et al. |
| 2013/0261871 A1 | 10/2013 | Hobbs et al. |
| 2014/0015736 A1 | 1/2014 | Kim |
| 2014/0192081 A1* | 7/2014 | Jin ..................... H04N 5/23219 345/625 |
| 2014/0247286 A1* | 9/2014 | Chi ........................ G09G 3/003 345/672 |
| 2014/0361977 A1* | 12/2014 | Stafford ............. G02B 27/0093 345/156 |
| 2015/0079932 A1* | 3/2015 | Zelinka ................. H04W 12/02 455/411 |
| 2015/0221247 A1* | 8/2015 | Herger ................ G02B 27/017 345/8 |
| 2015/0331242 A1* | 11/2015 | Cho ................... G02B 27/0172 345/8 |

* cited by examiner

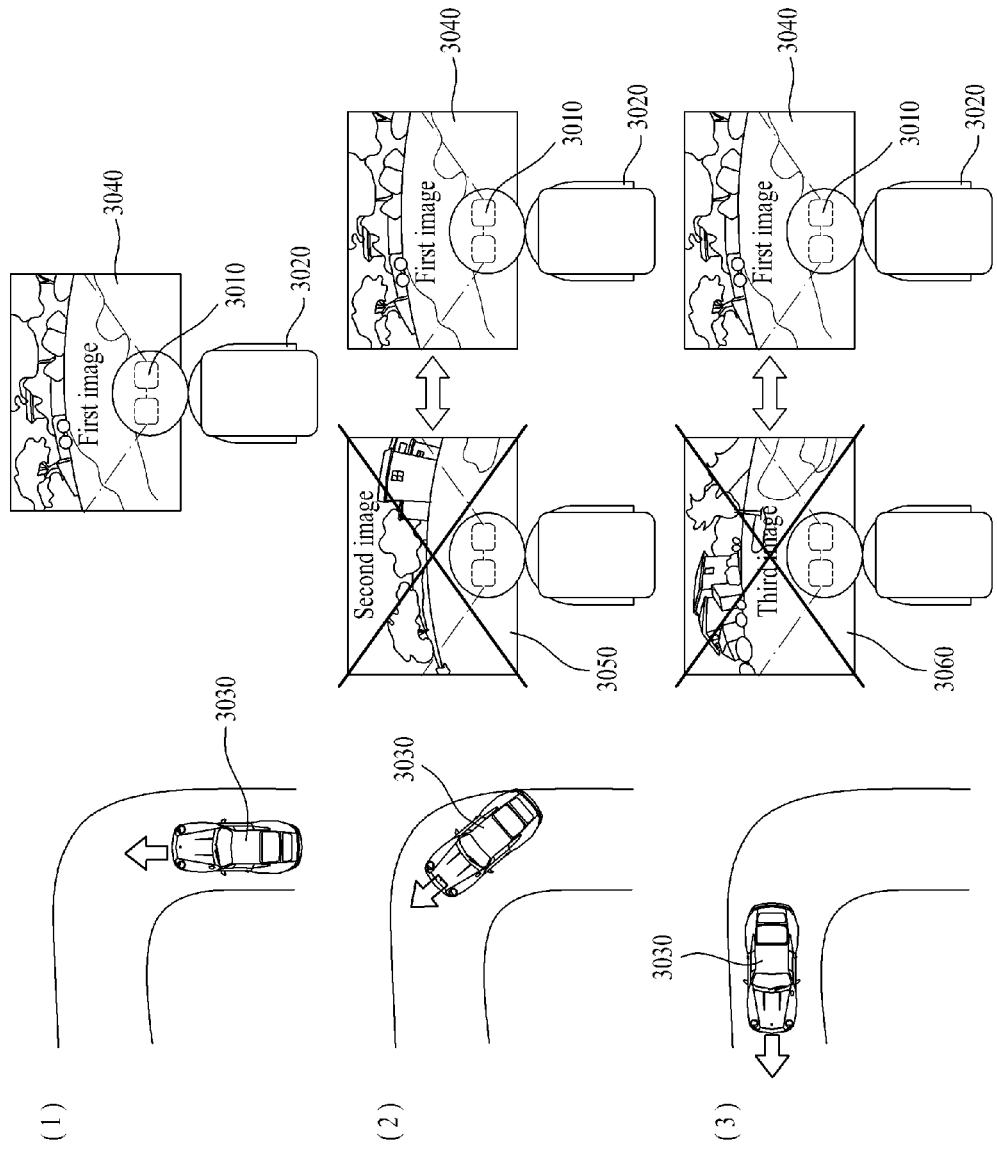

<First reference image>

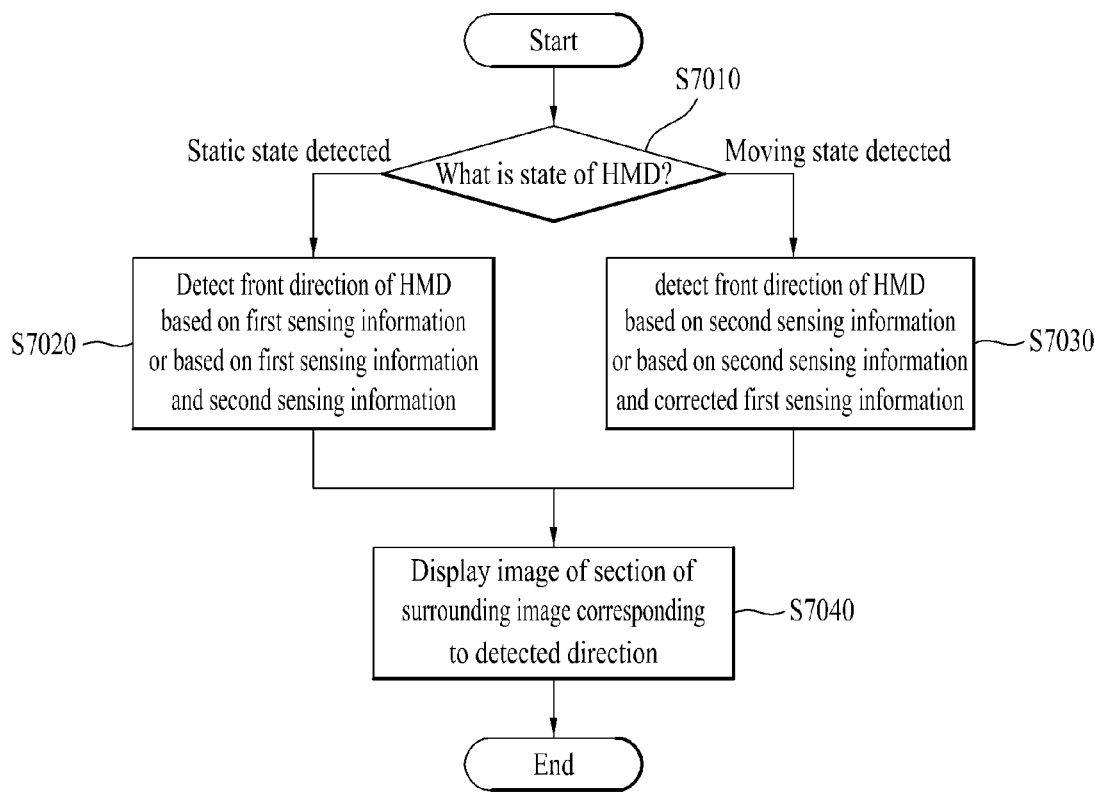

HEAD MOUNTED DISPLAY AND METHOD FOR CONTROLLING THE SAME

Pursuant to 35 U.S.C. §119(a), this application claims the benefit of Korean Patent Application No. 10-2014-0049194, filed on Apr. 24, 2014, which is hereby incorporated by reference as if fully set forth herein.

BACKGROUND OF THE INVENTION

1. Field of the Invention

The present disclosure relates to a head mounted display (HMD) configured to provide a surrounding image and a method for controlling the same, more particularly, to a method for controlling activation of sensor groups depending upon whether the HMD is in a static state or a moving state to more accurately sense rotation of the head of a user wearing the HMD and to display a surrounding image corresponding to the sensed rotation.

2. Discussion of the Related Art

A head mounted display (HMD) is a wearable device that is worn on the head like eye glasses to receive various kinds of information. With the trend toward more lightweight and compact digital devices, various wearable devices have been developed and HMDs have also been widely used. An HMD may not only function as a display, but also provide users with various services by combining augmented reality and N-screen technology.

Particularly, the HMD may provide a surrounding image to provide a more realistic virtual space to the user. Herein, the surrounding image may represent visual information unfolded around the HMD in all directions. Accordingly, the HMD may detect the direction in which the face of the user wearing the HMD is oriented and display an image of a section of the surrounding image corresponding to the detected direction. Thereby, the user may feel as if he/she is actually present in the virtual space.

However, in the case that the user wearing the HMD receives the surrounding image while moving, the HMD may fail to accurately sense rotation of the user's head, accordingly the HMD may perform an incorrect operation counter to the user's intention.

SUMMARY OF THE INVENTION

Accordingly, the present disclosure is directed to an HMD and a control method for the same which substantially obviate one or more problems due to limitations and disadvantages of the related art.

An object of the present disclosure is to provide an HMD configured to detect the static state or moving state of the HMD and to control activation of sensor groups according to the detected state and a method of controlling the same.

Another object of the present disclosure is to provide an HMD configured to detect, in the case that the HMD is in the static state, the direction in which the front of the HMD faces using sensing information acquired from the respective sensor groups and a method of controlling the same.

Another object of the present disclosure is to provide an HMD configured to correct, in the case that the HMD is in the moving state, sensing information acquired from a sensor group and detect the direction in which the front of the HMD faces using the corrected sensing information and a method of controlling the same.

Another object of the present disclosure is to provide an HMD configured to set, in the case that the front direction of the HMD is detected in the moving state, a reference image and a method of controlling the same.

Another object of the present disclosure is to provide an HMD configured to receive travel information from an external device to correct sensing information and a method of controlling the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a head mounted display (HMD) configured to provide a surrounding image including a display unit configured to display a section of the surrounding image corresponding to a front direction of the HMD, a first sensor group including at least one sensor configured to sense a motion of the HMD, a second sensor group including at least one sensor providing the HMD to capture a circumjacent image, and a processor configured to control the display unit, the first sensor group and the second sensor group to acquire first sensing information from the first sensor group and second sensing information from the second sensor group, wherein the processor is further configured to detect a state of the HMD using at least one of the first sensing information and the second sensing information, the state of the HMD including a static state in which an absolute position of the HMD does not change and a moving state in which the absolute position changes, detect, when the state of the HMD is detected as the static state, a direction in which a front of the HMD faces based on the first sensing information or based on the first sensing information and the second sensing information, detects, when the state of the HMD is detected as the moving state, the direction in which the front of the HMD faces based on the second sensing information or based on the second sensing information and the corrected first sensing information, and display an image of a section of the surrounding image corresponding to the detected direction.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 3A and 3B are views illustrating detection of the moving state of the HMD according to one embodiment;

FIG. 7 is a flowchart illustrating a method of controlling the HMD.

DETAILED DESCRIPTION OF THE INVENTION

Although the terms used in this specification are selected, as much as possible, from general terms that are widely used in the art at present while taking into consideration of functions of the elements, these terms may be replaced by other terms according to intentions of those skilled in the art, customs, emergence of new technologies, or the like. In addition, in a specific case, terms that are arbitrarily selected by the applicant may be used. In this case, meanings of these terms may be disclosed in corresponding parts of this specification. Accordingly, it should be noted that the terms used herein should be construed based on practical meanings thereof and the whole content of this specification, rather than being simply construed based on names of the terms.

Reference will now be made in detail to the preferred embodiments of the present disclosure, examples of which are illustrated in the accompanying drawings. Wherever possible, the same reference numbers will be used throughout the drawings to refer to the same or like parts. However, the scope of the present disclosure is not limited to the illustrated embodiments.

Figure 1:
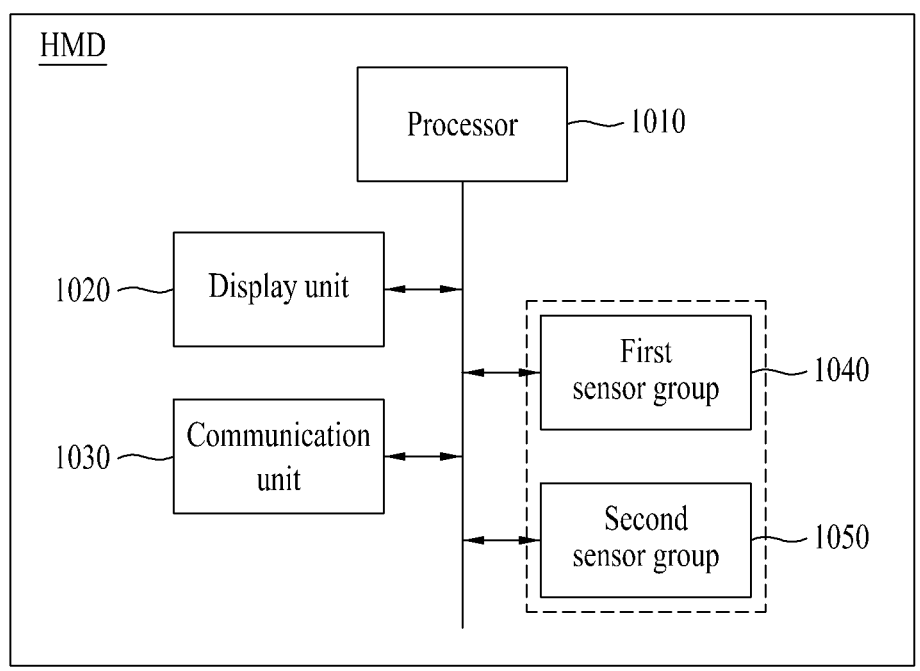
FIG. 1 is a block diagram illustrating a head mounted display (HMD) according to the present disclosure.

FIG. 1 is a block diagram illustrating a head mounted display (HMD) according to the present disclosure. As shown in FIG. 1, the HMD may include a display unit 1020, a communication unit 1030, a first sensor group 1040, a second sensor group 1050 and a processor 1010. According to one embodiment, some of the constituents shown in FIG. 1 may not be employed and a new constituent may be added, when desired by a person skilled in the art.

The display unit 1020 may display an image. Herein, the image may represent visual information visually recognizable by a user, which may include pictures, photos, text, moving images, videos, an execution window of an application, etc. Particularly, in the present disclosure, the display unit 1020 may display a circumjacent image. Herein, the surrounding image may represent an unfolded image shown in all directions (e.g., front, rear, left, right, up and down directions) around the HMD. Particularly, the processor 1010 may detect the direction in which the user's face is oriented and provide a surrounding image corresponding to this direction. Thereby, the HMD may provide the user with a more realistic virtual environment.

The communication unit 1030 may perform communication with an external device based on various protocols to transmit/receive data. In addition, the communication unit 1030 may access a wired or wireless network to transmit/receive digital data such as content. For example, the communication unit 1030 may use communication standards WLAN (Wireless LAN), Wi-Fi, WiBro (Wireless broadband), WiMAX (World Interoperability for Microwave Access), and HSDPA (High Speed Downlink Packet Access) to access a wireless network. According to one embodiment of the present disclosure, the external device may be a means of transportation (e.g. a vehicle). A related example will be described in detail below.

The first sensor group 1040 may represent a group of sensors which sense motion of the HMD. More specifically, the first sensor group 1040 may present a group of sensors which sense position, action, rotation and movement of the HMD. Accordingly, the first sensor group 1040 may include at least one sensor configured to sense a motion of the HMD. For example, the first sensor group 1040 may include at least one of an acceleration sensor, a gyro sensor, a geomagnetic sensor, a global positioning system (GPS) sensor, a pressure sensor, an elevation sensor and a proximity sensor. In addition, the first sensor group 1040 may include various other sensors for sensing a motion of the HMD.

The sensor(s) included in the first sensor group 1040 may be simultaneously activated or deactivated by a control signal from the processor 1010. When activated, the first sensor group 1040 may transmit the result of sensing of a motion of the HMD to the processor 1010 as first sensing information. Upon receiving the first sensing information, the processor 1010 may detect the motion of the HMD to perform various control operations.

The second sensor group 1050 may represent a group of sensors for capturing an image of surroundings of the HMD. Accordingly, the second sensor group 1050 may include at least one sensor for capturing a circumjacent image of the HMD. For example, the second sensor group 1050 may include at least one of a camera sensor, an infrared sensor and a proximity sensor.

The sensor(s) included in the second sensor group 1050 may be simultaneously activated or deactivated by a control signal from the processor 1010. When activated, the second sensor group 1050 may transmit the result of capturing the circumjacent image of the HMD to the processor 1010 as the second sensing information. Upon receiving the second sensing information, the processor 1010 may detect the circumjacent image of the HMD to perform various control operations.

The first sensor group 1040 and the second sensor group 1050 may share the same sensor. In addition, the first sensor group 1040 and the second sensor group 1050 may be activated simultaneously or respectively by the processor 1010.

The processor 1010 may control each of the units of the HMD and also control transmission/reception of data or information between the units. In addition, the processor 1010 may process data in the HMD to execute various applications. In addition, the processor 1010 may control content executed in the HMD based on a control command.

More specifically, the processor 1010 may provide a surrounding image using the display unit 1020. Herein, the surrounding image may represent an image unfolded in all directions (e.g., front, rear, left, right, up and down directions) around the HMD, as described above. The processor 1010 may detect the direction in which the user's face is oriented and display an image of a section of a surrounding image corresponding to the direction of the face. Thereby, the processor 1010 may enable the user feel present in a virtual space provided by the surrounding image.

At this time, to accurately detect the direction in which the user's face is oriented, the processor 1010 uses first sensing information acquired from the first sensor group 1040 and second sensing information acquired from the second sensor group 1050. First, the processor 1010 may detect whether the state of the HMD is a static state, in which the absolute position of the user does not change, or a moving state, in which the absolute position of the user changes, using the first sensing information and/or the second sensing information. The processor 1010 may control activation of the first sensor group 1040 and the second sensor group 1050 according to the detected static state or moving state, thereby detecting the orientation of the user's face and/or the degree of rotation of the user's head, which will be described in detail later.

In the case that the processor 1010 detects the direction of the user's face, the processor 1010 may display an image of a section of a surrounding image corresponding to the direction of the face. At this time, the processor 1010 may display the surrounding image using various techniques. According to one embodiment, the processor 1010 may display the image with a see-through technique. The see-through technique represents a technique of allowing the user wearing an HMD to recognize an image displayed on a transparent display panel while recognizing a circumjacent environment. According to another embodiment, the processor 1010 may display an image with a front-light technique. The front-light technique represents a technique of displaying an image through an image rather than directly projecting light onto the user's eyes. According to another embodiment, the processor 1010 may display an image with a see-closed technique. The see-closed technique represents a technique of allowing the user wearing an HMD to recognize an image displayed on an opaque display panel without recognizing a circumjacent environment.

Hereinafter, it will be assumed that the processor 1010 displays an image with the see-closed technique. The present disclosure is not limited to this embodiment. The see-through technique and the front-light technique are also applicable to the embodiments discussed below.

In the description given below, it will be assumed that the process of generating and receiving a signal according to sensing information, which will not be repeatedly described, is included in the case that each step or operation performed by the HMD begins with the sensing information. In addition, the processor 1010 may be described as controlling the HMD or at least one unit included in the HMD according to the sensing information, and may also be referred as a device.

In the block diagram of FIG. 1 illustrating a device according to one embodiment, the separately indicated blocks represent hardware units of the device which are logically distinguished from each other. Accordingly, the hardware units of the device may be installed as one chip or plural chips according to design of the device.

Figure 2:
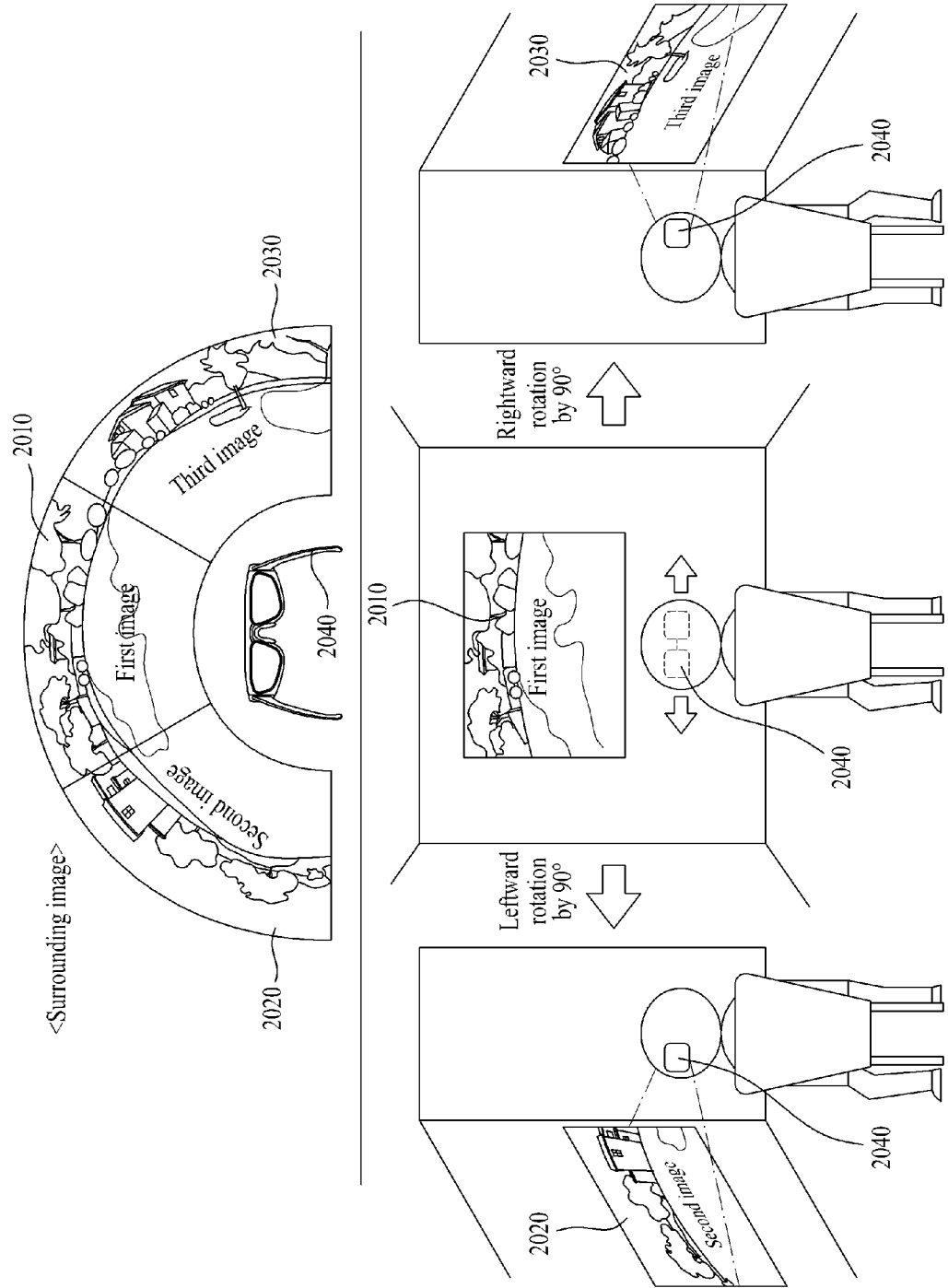
FIG. 2 is a view illustrating an HMD providing a surrounding image according to one embodiment.

FIG. 2 is a view illustrating an HMD providing a surrounding image according to one embodiment;

In the present disclosure, the HMD 2040 may provide a surrounding image. Herein, the surrounding image is an image unfolded in all directions around the HMD 2040, as mentioned above. Accordingly, the HMD 2040 may provide a surrounding image corresponding to various directions such as up, down, left, right, front and rear directions. Otherwise, the HMD 2040 may provide a surrounding image corresponding to various directions including horizontal, vertical, and diagonal directions. However, the surrounding image is not limited to the image unfolded in all directions. It includes an image unfolded only in the front-rear direction, left-right direction, up-down direction, vertical direction, horizontal direction, or diagonal direction.

The HMD 2040 may detect the direction of the user's face and provide an image of a section of a surrounding image corresponding to this direction. In the present disclosure, the HMD 2040 may indirectly detect the direction of the user's face by detecting the direction in which the front of the HMD 2040 is oriented since the HMD 2040 is a wearable device worn on the user's face. Since the direction in which the user's face is oriented is indirectly detected by detecting the direction in which the front of the HMD 2040 is oriented, there may be a certain error between those two directions. For example, in the case that a vehicle turns left or right while the user riding thereon gazes at a surrounding image, the HMD 2040 may recognize that the front direction of the HMD 2040 has changed even though the user's head has not rotated. Herein, rotation of the user's head may represent a case in which only the user's face rotates with the user's body fixed (or not rotating). In this case, the HMD 2040 may perform an incorrect operation of providing a surrounding image corresponding to the direction changed differently from the user's intention.

To prevent such incorrect operation, the HMD 2040 may first detect the state of the HMD 2040. Herein, the state of the HMD 2040 may include a static state in which the absolute position of the HMD 2040 does not change and a moving state in which the absolute position of the I-IMD 2040 changes. More specifically, the state of the HMD 2040 may include a static state in which the absolute position of the HMD 2040 is "substantially" unchanged and a moving state in which the absolute position of the HMD 2040 "substantially" changes. Whether the absolute position of the HMD 2040 "substantially" changes may be determined based on a threshold distance. For example, in the case that the absolute position of the HMD 2040 changes by a distance less than or equal to a threshold distance for a predetermined time, the HMD 2040 may detect the state of the HMD 2040 as the static state. On the other hand, in the case that the absolute position of the HMD 2040 changes by a distance greater than a threshold distance for the predetermined time, the HMD 2040 may detect the state of the HMD 2040 as the moving state. Herein, the threshold distance may be set to various values by the method of manufacturing the HMD 2040, the type of an executed application, the user, and the like.

The state of the HMD 2040 may be detected using at least one of the aforementioned first sensor group and second sensor group. In other words, the state of the HMD 2040 may be detected using the first sensing information, which is a result of sensing by the first sensor group, and/or the second sensing information, which is a result of sensing by the second sensor group.

According to one embodiment, in detecting the state of the HMD 2040 using the first sensing information, the HMD 2040 may acquire information about the absolute position of the HMD 2040 as the first sensing information using a GPS sensor included in the first sensor group. The HMD 2040 may receive information about the absolute position of the HMD 2040 in real time using the GPS sensor and detect whether the HMD 2040 moves by a distance less than or equal to the threshold distance or a distance greater than the threshold distance for the predetermined time, thereby detecting the state of the HMD 2040.

According to another embodiment, in detecting the state of the HMD 2040 using the second sensing information, the HMD 2040 the HMD 2040 may detect the state of the HMD 2040 by processing an acquired surrounding image using the second sensor group. More specifically, the HMD 2040 may capture a circumjacent image of the HMD 2040 as the second sensing information using the second sensor group. Furthermore, the HMD 2040 may process the captured circumjacent image and detect the state of the HMD 2040 base on the result of processing. For example, in the case that the circumjacent image is changed beyond a predetermined ratio for a predetermined time, the HMD 2040 may detect that the absolute position of the HMD 2040 has substantially changed, and thus detect the state of the HMD 2040 as the moving state.

In another embodiment, the HMD 2040 may detect the state of the HMD 2040 by acquiring sensing information from an external device using a communication unit. In the case that the external device is a means of transportation (vehicle) that the user may ride, the device may detect the state of the HMD 2040 by performing communication with the external device. For example, in the case that the external device travels at a speed greater than a predetermined speed, the external device may transmit travel information related to traveling to the HMD 2040. When the HMD 2040 receives such travel information, it may detect change of the absolute position of the HMD 2040 based on the travel information and detect the state of the HMD 2040 based on the detected change of the absolute position of the HMD 2040.

In the case that the HMD 2040 detects the static state of the HMD 2040 through one or a combination of the aforementioned embodiments, the HMD 2040 may control activation of the first sensor group and the second sensor group. According to one embodiment, when the HMD 2040 detects the static state of the HMD 2040, the HMD 2040 may activate the first sensor group or maintain activation of the first sensor group. At this time, the HMD 2040 may deactivate the second sensor group. Further, the HMD 2040 may acquire the first sensing information and detect the direction in which the front of the HMD 2040 faces, based on the acquired first sensing information. For example, the HMD 2040 may detect the direction and/or degree of rotation of the HMD 2040 using a gyro sensor and/or an acceleration sensor included in the first sensor group, and detect the direction in which the front of the HMD 2040 is oriented, based on the detected direction and degree of rotation. Since the absolute position of the HMD 2040 is static, an error between the front direction of the HMD 2040 and the direction in which the user's face is oriented is not great even though only the first sensor group is used.

According to another embodiment, in the case that the HMD 2040 detects the static state of the HMD 2040, the HMD 2040 may simultaneously activate the first sensor group and the second sensor group or maintain activation of the first sensor group and the second sensor group. Further, the HMD 2040 may acquire the first sensing information from the activated first sensor group and the second sensing information from the second sensor group, and then detect the direction in which the front of the HMD 2040 faces, based on the acquired first sensing information and second sensing information. For example, the HMD 2040 may detect the direction and/or degree of rotation of the HMD 2040 using a gyro sensor and/or an acceleration sensor included in the first sensor group and process a circumjacent image using a camera sensor included in the second sensor group, thereby detecting the direction in which the front of the HMD 2040 is oriented. Unlike the previous embodiment, the HMD 2040 of this embodiment uses the second sensor group in addition to the first sensor group, and therefore may detect the direction of the front of the HMD 2040 more accurately and rapidly.

In the case that the HMD 2040 detects the moving state of the HMD 2040 through one or a combination of the aforementioned embodiments, the HMD 2040 may also control activation of the first sensor group and the second sensor group. A detailed description of this embodiment will be given below with reference to FIGS. 3A to 6B.

When the HMD 2040 detects the direction in which the front of the HMD 2040 faces, it may display an image of a section of a surrounding image corresponding to the detected direction. For example, in the case that the HMD 2040 detects that the front of the HMD 2040 faces in a first direction, as shown in the figures, the HMD 2040 may display a first image 2010 corresponding to the first direction. At this time, in the case that leftward rotation of the HMD 2040 by 90° is detected, the HMD 2040 may display a second image 2020 corresponding to this direction of rotation. Herein, the second image 2020 may be a partial image included in the surrounding image. In the case that rightward rotation of the HMD 2040 by 90° is detected, the HMD 2040 may display a third image 2030 corresponding to this direction of rotation. Herein, the third image 2030 may be a partial image included in the surrounding image.

Figure 3A:
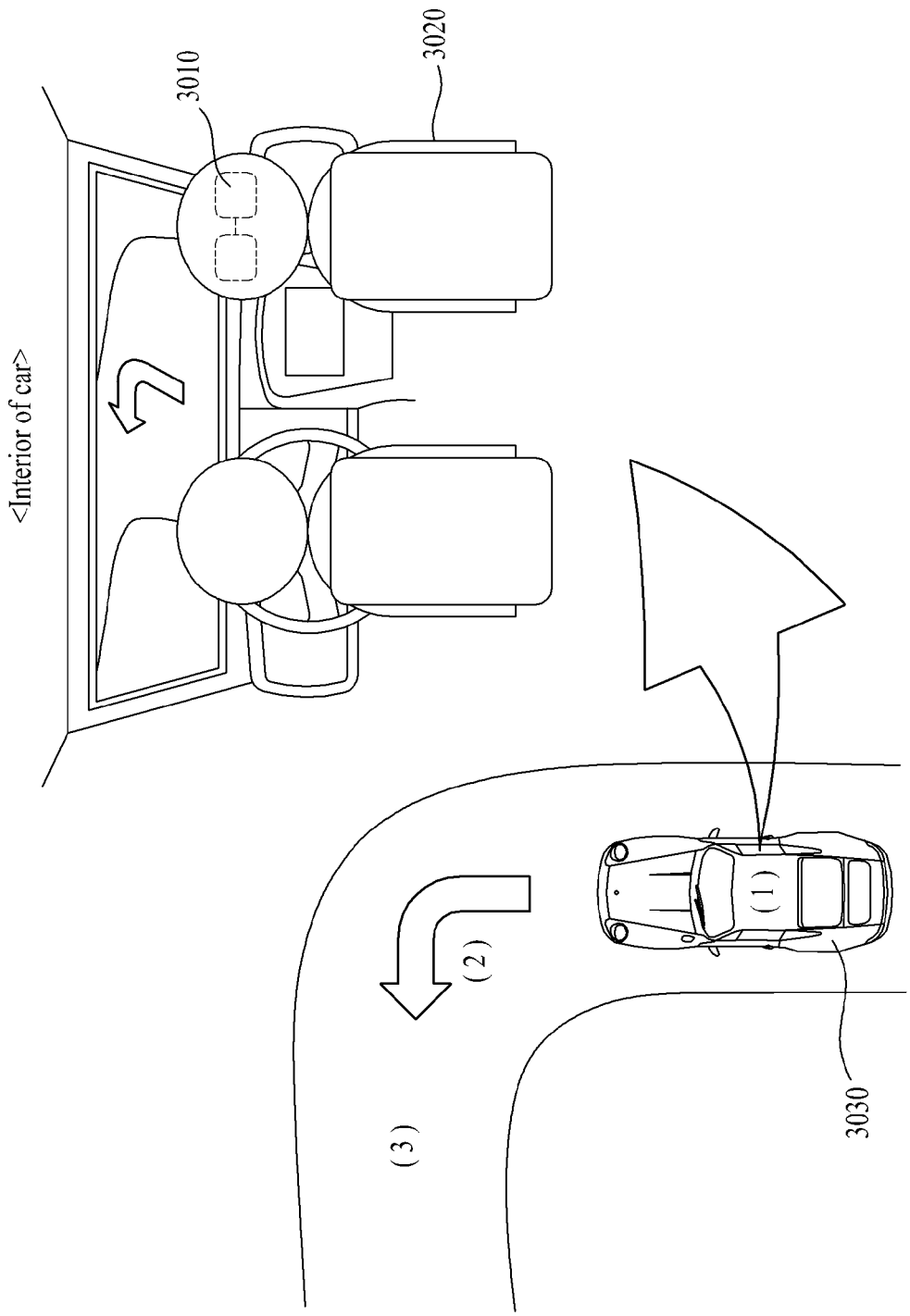

FIGS. 3A and 3B are views illustrating detection of the moving state of the HMD according to one embodiment.

The HMD 3010 in the moving state detects only a motion of the HMD 3010, and thus it is difficult form the HMD 3010 to accurately detect rotation of the head of the user 3020. In other words, the HMD 3010 in the moving state uses only the first sensor group configured to detect the motion of the HMD 3010, and thus may not accurately detect rotation of the head of the user 3020.

In the case that only the first sensor group is used, the HMD 3010 detects only the motion of the HMD 3010, and thus it may detect that the head of the user 3020 has rotated, even when the head of the user 3020 does not rotate, but the body of the user 3020 rotates. Herein, rotation of the head may represent the case in which only the face of the user 3020 rotates without rotation of the body of the user 3020. Accordingly, in this case, the HMD 3010 may use only the second sensor group configured to capture a circumjacent image in place of the first sensor group configured to sense motion of the HMD 3010, or may use both the first sensor group and the second sensor group to detect rotation of the front of the HMD 3010. Accordingly, it may detect rotation of the head of the user 3020 more accurately. Thereby, incorrect operation of the HMD 3010 may be prevented.

More specifically, in the case that the moving state of the HMD 3010 is detected using the embodiment illustrated in FIG. 2, the HMD 3010 may detect activation of the first sensor group and the second sensor group. According to one embodiment, upon detecting the moving state of the HMD 3010, the HMD 3010 may activate the second sensor group or maintain activation of the second sensor group. At this time, the HMD 3010 may deactivate the first sensor group. Further, the HMD 3010 may acquire the second sensing information from the activated second sensor group and detect the direction in which the front of the HMD 3010 faces, based on the acquired second sensing information. For example, the HMD 3010 may capture a circumjacent image of the HMD 3010 using a camera sensor included in the second sensor group and compare the captured circumjacent image with a predetermined image or a reference image. Thereby, the direction in which the front of the HMD 3010 faces may be detected. A detailed description will be given later with reference to FIGS. 4A to 5B.

According to another embodiment, when the moving state of the HMD 3010 is detected, the HMD 3010 may activate the first sensor group and the second sensor group or maintain activation of the first sensor group and the second sensor group. Further, the HMD 3010 may acquire first sensing information and second sensing information respectively from the activated first sensor group and second sensor group, and the direction in which the front of the HMD 3010 faces, based on the acquired first sensing information and second sensing information. Since the first sensing information may involve a certain error as described above, the HMD 3010 may correct the first sensing information and detect the direction in which the front of the HMD 3010 faces, based on the corrected first sensing information. For example, the HMD 3010 may acquire a circumjacent image as the second sensing information, using the camera sensor included in the second sensor group. In addition, the HMD 3010 may acquire motion of the HMD 3010 as the first sensing information, using a sensor included in the first sensor group. Since a certain error may be produced in the first sensing information in detecting rotation of the head of the moving user 3020, the HMD 3010 may correct the acquired first sensing information. At this time, the HMD 3010 may use the communication unit to acquire information for correction of the first sensing information from the external device 3030, as will be described in detail later with reference to FIGS. 6A and 6B. The HMD 3010 may detect the direction in which the front of the HMD 3010 faces, using the acquired second sensing information and the corrected first sensing information. Thereby, the orientation of the head of the user 3020 may be indirectly detected.

A detailed description will be given below of operation of the HMD 3010 performed in the case that the user 3020 in a traveling vehicle as shown in FIG. 3A is provided with surrounding images 3040, 3050 and 3060 through the HMD 3010. Particularly, a detailed description will be given of the case in which the car 3030 turns left with the user 3020 riding thereon.

For example, in the case that a passenger gazes in the front direction as shown in FIG. 3B, the HMD 3010 may display a first image 3040 of the surrounding images 3040, 3050 and 3060 corresponding to the front direction. In the case that the car 3030 turns during traveling, the displayed surrounding image 3040, 3050 and 3060 may vary according to an activated sensor group to detect rotation of the head of the user 3020. In the case that the car 3030 turns left by 45° and rotation of the head of the user 3020 is detected using only the first sensor group, the HMD 3010 may detect that the front of the HMD 3010 has been rotated 45° leftward by rotation of the car 3030. In other words, the HMD 3010 may detect that the user 3020 wearing the HMD 3010 has turned their head leftward by 45°. As a result, the HMD 3010 may display a second image 3050 corresponding to the direction rotated 45° leftward. Further, as shown in FIG. 3B, in the case that the car 3030 is rotated 90° by completing turning left (FIG. 3B-(3)), the HMD 3010 may detect that the HMD 3010 has rotated 90° leftward, and thus display a third image 3060 corresponding to this rotated direction.

This operation of the HMD 3010 may be counter to the intention of the user 3020. It is more probable that the moving user 3020 does not turn their whole body but rather simply turns the head with the body substantially not rotated, as intended to see an image in the left direction or right direction. Accordingly, as described above, changing the images by detecting rotation of the whole body with the first sensor group may counter to the intention of the user 3020. In the present disclosure, in the case that the HMD 3010 detects the moving state of the HMD 3010, the HMD 3010 uses the second sensing information alone or the corrected first sensing information and the second sensing information to detect rotation of the user 3020. Thereby, the aforementioned incorrect operation of the HMD 3010 may be prevented.

Accordingly, the HMD 3010 of the present disclosure may maintain the first image 3040 corresponding to the front direction even when the vehicle turns left by 45° or 90°.

Hereinafter, a detailed description will be given of embodiments in which the HMD 3010 in the moving state detects the front direction of the HMD 3010 using the second sensing information or using the corrected first sensing information and the second sensing information. More specifically, an embodiment of the HMD 3010 detecting the front direction using only the second sensing information will be described in detail with reference to FIGS. 4A and 5B. In addition, another embodiment of the HMD 3010 detecting the front direction using the corrected first sensing information and the second sensing information will be described with reference to FIGS. 6A and 6B.

When the HMD 3010 detects the moving state, it may activate the second sensor group or maintain activation of the second sensor group. At this time, the HMD 3010 may deactivate the first sensor group. The HMD 3010 may acquire the second sensing information and detect the front direction of the HMD 3010 using the acquired second sensing information.

To detect the front direction of the HMD 3010 or the direction of the head of the user 3020 using the second sensing information, the HMD 3010 may pre-detect whether a current space containing the user 3020 is an open space or a closed space. Depending upon whether the current space is an open space or a closed space, the HMD 3010 may acquire the second sensing information in different manners. For example, the method of detecting the front direction of the HMD 3010 using the second sensing information may differ between the case in which the user 3020 travels in the car 3030 and the case in which the user 3020 walks.

Accordingly, in the case that the HMD 3010 in the moving state detects the front direction using the second sensing information, the HMD 3010 may detect the type of the space in which the MID 3010 is contained. At this time, the HMD 3010 may detect the type of the space containing the HMD 3010 through various embodiments. According to one embodiment, the HMD 3010 may detect the type of the space containing the HMD 3010 by matching a circumjacent image of the HMD 3010 with a predetermined image.

For example, in the case that the HMD 3010 stores an internal image of the vehicle as the predetermined image, the HMD 3010 may capture a circumjacent image using the second sensor group and match the captured circumjacent image with the predetermined image. At this time, upon detecting that the captured image matches the circumjacent image within a ratio greater than a predetermined ratio, the HMD 3010 may detect the space containing the HMD 3010 as a closed space. On the other hand, upon detecting that the captured image and the circumjacent image match a ratio less than or equal to the predetermined, the HMD 3010 may detect the space containing the HMD 3010 as an open space. According to another embodiment, the HMD 3010 may acquire a circumjacent image as the second sensing information using the camera sensor included in the second sensor group and process the circumjacent image to detect the type of the space containing the HMD 3010. Alternatively, in the case that the user 3020 wearing the HMD 3010 rides in an external device, the HMD 3010 may perform communication with the external device to detect the type of the space containing the HMD 3010. The HMD 3010 may detect the type of the space containing the HMD 3010 through various embodiments and the detection operation is not limited to the described embodiments.

Hereinafter, a detailed description will be given of a method for the HMD 3010 to detect the front direction of the HMD 3010 after detecting the closed space or open space according to the described embodiments.

Figure 4A:
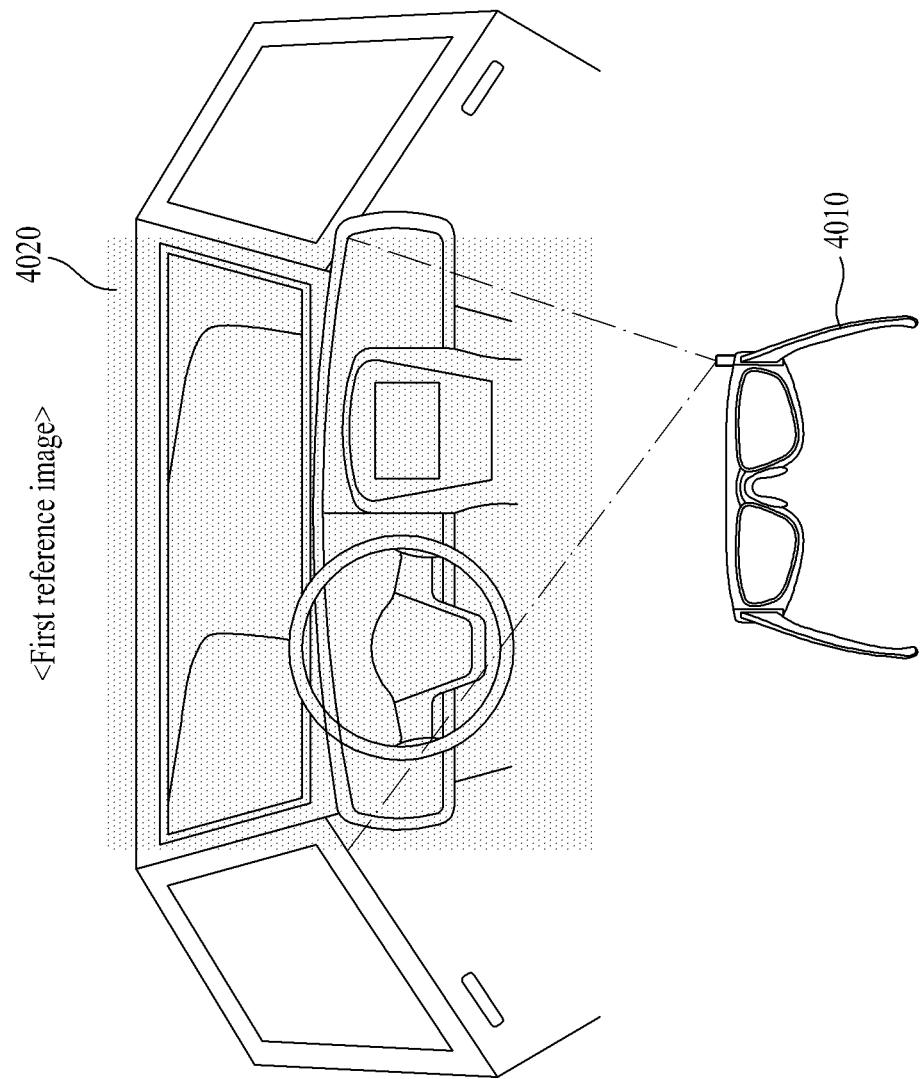
FIG. 4A is a view illustrating the HMD setting a first reference image according to one embodiment.

FIG. 4A is a view illustrating the HMD setting a first reference image according to one embodiment;

In the case that the closed space is detected through the embodiments described above, the HMD 4010 may set a first reference image 4020. More specifically, upon detecting the closed space, the HMD 4010 may set a circumjacent image in a first direction as the first reference image 4020 using the second sensor group. Herein, the first direction may be set to be various directions such as front, rear, up, down, left, right and diagonal directions. For example, in the case that the HMD 4010 detects the closed space and this closed space is the interior of the vehicle, the HMD 4010 may set an image of the driver's seat in the front direction of the HMD 4010 as the first reference image 4020, as shown in FIG. 4A.

This is intended to accurately detect rotation of the user's head by setting the image of the closed space as the first reference image 4020 and matching the first reference image 4020 with a captured circumjacent image in real time. A detailed description of the HMD 4010 detecting rotation of the user's head or the front direction of the HMD 4010 using the first reference image 4020 will be given below with reference to FIG. 4B.

As described above, in the case that the HMD 4010 detects a closed space, the HMD 4010 may reset the image of the closed space as the first reference image 4020. However, in another embodiment, the first reference image 4020 may be preset before the closed space is detected. For example, in the case that the closed space is detected when the predetermined image matches the circumjacent image as described above, the HMD 4010 may set the predetermined image to the first reference image 4020. In addition, the user may set an internal image of a frequently encountered living space such as home and a car as the first reference image 4020.

Figure 4B:
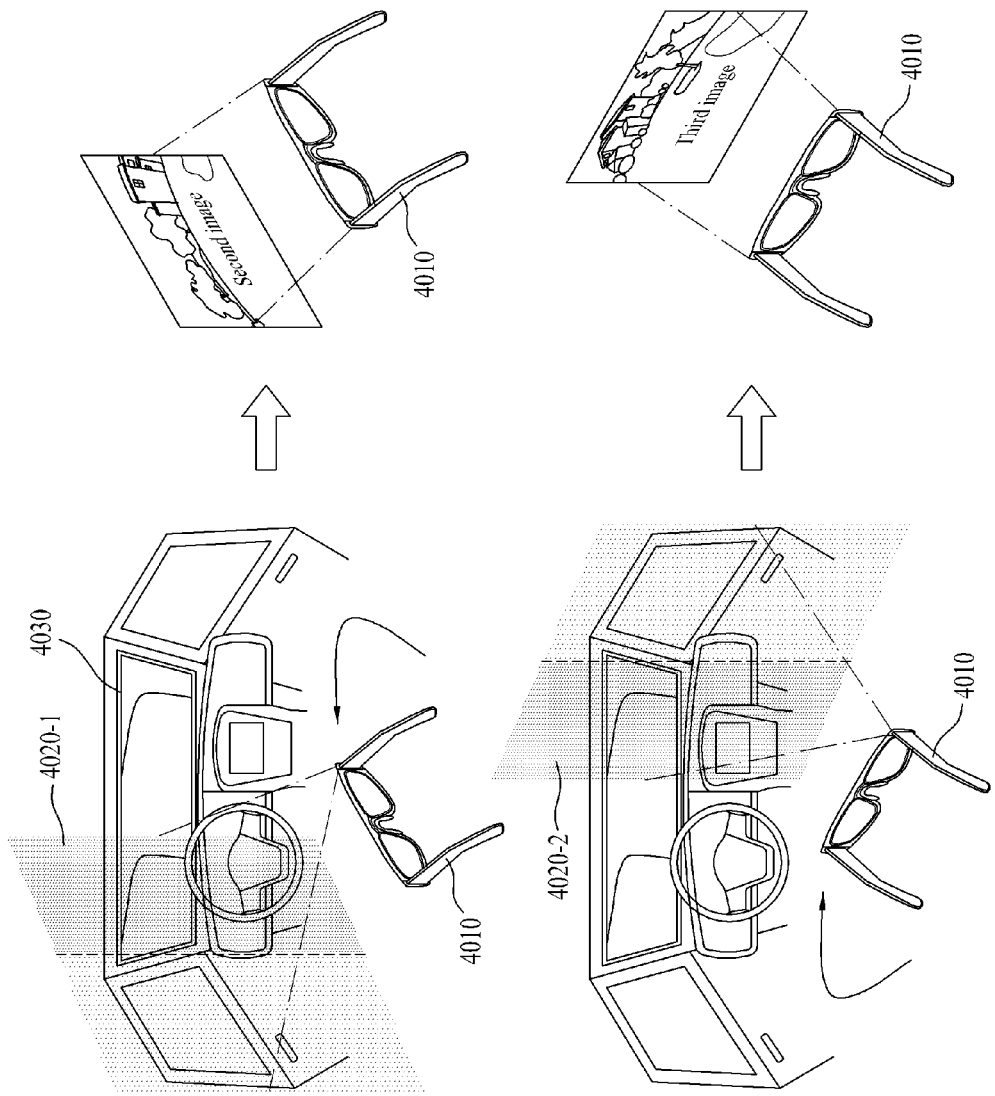
FIG. 4B is a view illustrating the HMD detecting the front direction of the HMD using the first reference image according to one embodiment.

FIG. 4B is a view illustrating the HMD detecting the front direction of the HMD using the first reference image according to one embodiment.

In the case that the first reference image 4020 is set through the embodiment related to FIG. 4A, the HMD 4010 may detect the front direction of the HMD 4010 by matching the first reference image 4020 with a circumjacent image in real time. More specifically, the HMD 4010 may acquire a circumjacent image using at least one sensor included in the second sensor group and compare the acquired circumjacent image with the first reference image 4020 in real time. Alternatively, the HMD 4010 may compare the acquired circumjacent image with the first reference image 4020 at predetermined time intervals. The HMD 4010 may detect the matching sections of the first reference image 4020 and the circumjacent image, the position of the matching sections and/or the degree of matching, thereby detecting the direction in which the front of the HMD 4010 faces.

For example, in the case that a section of the circumjacent image detected in real time matches a left section 4020-1 of the first reference image 4020, the HMD 4010 may detect that the front of the HMD 4010 has rotated leftward. In the case that a section of the circumjacent image detected in real time matches a right section 4020-2 of the first reference image 4020, the HMD 4010 may detect that the front of the HMD 4010 has rotated rightward. In this case, the HMD 4010 may display an image in the surrounding image corresponding to the detected direction.

In the case that an internal image of a transport means (e.g., a car or a train) is set as the first reference image 4020, the HMD 4010 may detect a variable image section 4030 of the first reference image 4020 which is changeable. For example, in the case that the internal image of a car is set as the first reference image 4020, the HMD 4010 may detect a window image 4030 in the internal image of the car as the variable image. Thereby, the HMD 4010 may detect the window image by processing the internal image of the car.

At this time, in matching the first reference image 4020 with a circumjacent image, the HMD 4010 may match the first reference image 4020 other than the detected section of the variable image with the circumjacent image. This is because the window image of the car may consistently change due to movement of the car. In the case that the first reference image 4020 including the variable image matches a circumjacent image in real time, the HMD 4010 may perform the matching operation even for the unnecessary section, and accordingly the matching operation may take a long time and matching accuracy may be lowered, thereby increasing the possibility of incorrect operation. Accordingly, the HMD 4010 may detect a variable image in the first reference image 4020 and thus perform matching with the circumjacent image more efficiently.

Figure 5A:
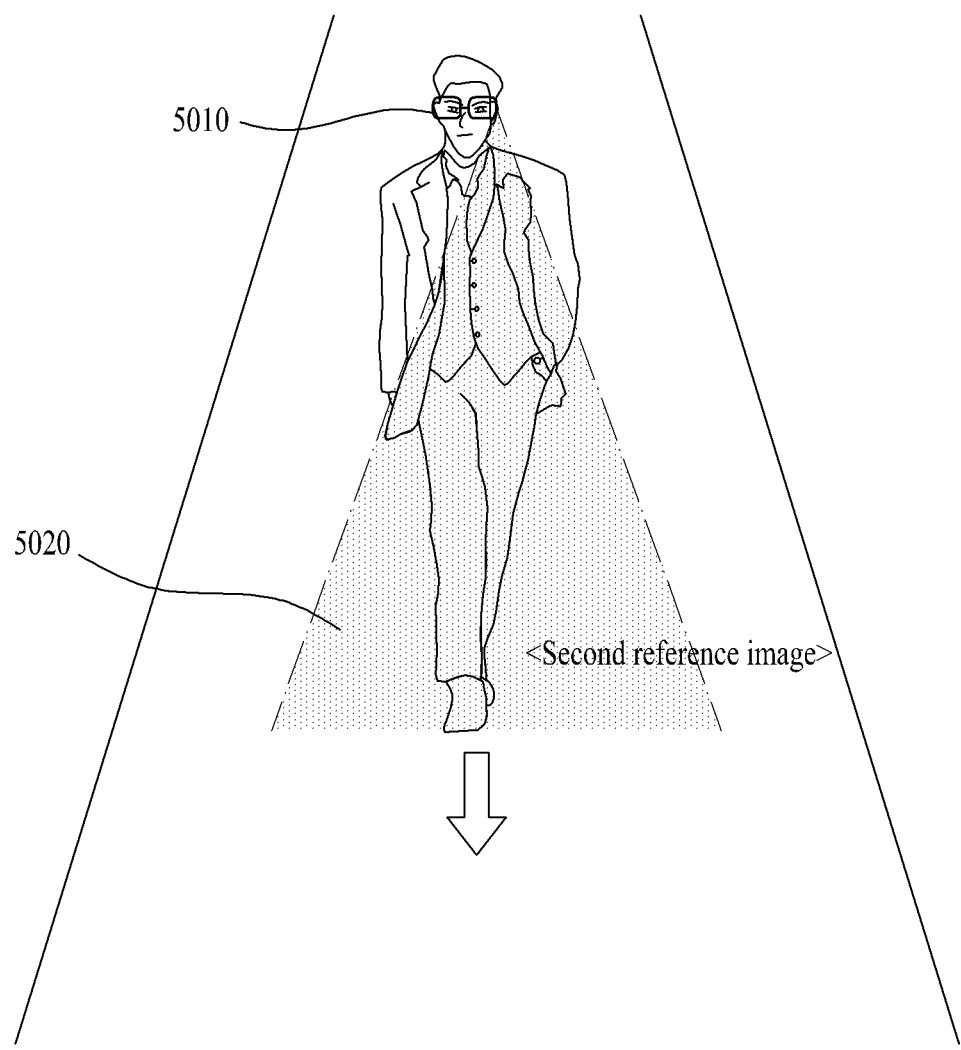
FIG. 5A is a view illustrating the HMD setting a second reference image according to one embodiment.

FIG. 5A is a view illustrating the HMD setting a second reference image according to one embodiment.

In the case that the open space is detected through the embodiments described above, the HMD 5010 may set a second reference image 5020. More specifically, upon detecting the open space, the HMD 5010 may set a circumjacent image in a second direction as the second reference image 5020 using the second sensor group. Herein, the second reference image 5020 may be an image of the user's body. Accordingly, the second direction may represent the downward direction of the HMD 5010. For example, when the HMD 5010 detects an open space for example, in the case that the user wearing the HMD 5010 walks along a street, the HMD 5010 may set an image (e.g., a shoulder image) of the user's body positioned below the HMD 5010 as the second reference image 5020.

This is intended to accurately detect rotation of the user's head with respect to the user's body by setting the image of the user's body as the second reference image 5020 and matching the second reference image 5020 with a captured circumjacent image in real time. A detailed description of the HMD 5010 detecting rotation of the user's head or the front direction of the HMD 5010 using the second reference image 5020 will be given below with reference to FIG. 5B.

The second reference image 5020 may be set before the open space is detected. A relevant detailed description has been given above with reference to FIG. 4A.

Meanwhile, the HMD 5010 may set the first reference image in the first direction and the second reference image 5020 in the second direction using the same camera sensor included in the second sensor group. At this time, the HMD 5010 may rotate the camera sensor from the first direction to the second direction to acquire the second reference image 5020. Alternatively, the HMD 5010 may set the first reference image and the second reference image 5020 respectively using plural camera sensors facing in the first direction and the second direction respectively.

Figure 5B:
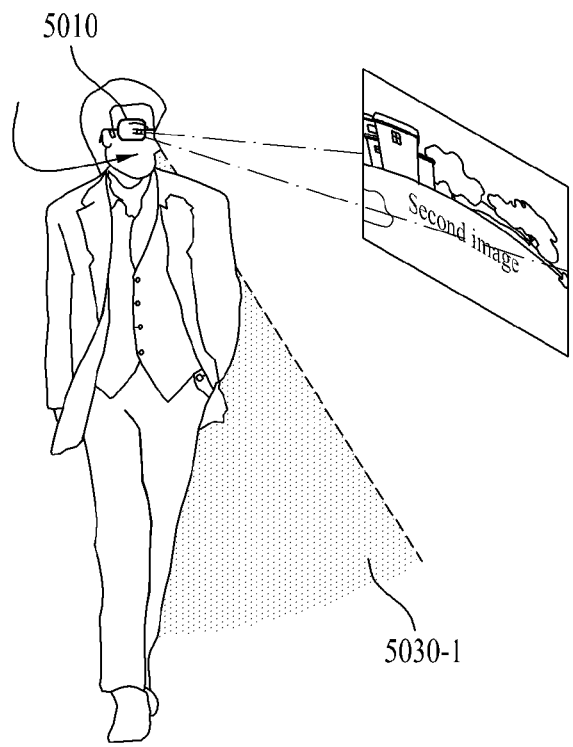
FIG. 5B is a view illustrating the HMD detecting the front direction of the HMD using the second reference image according to one embodiment.
Figure 5B:
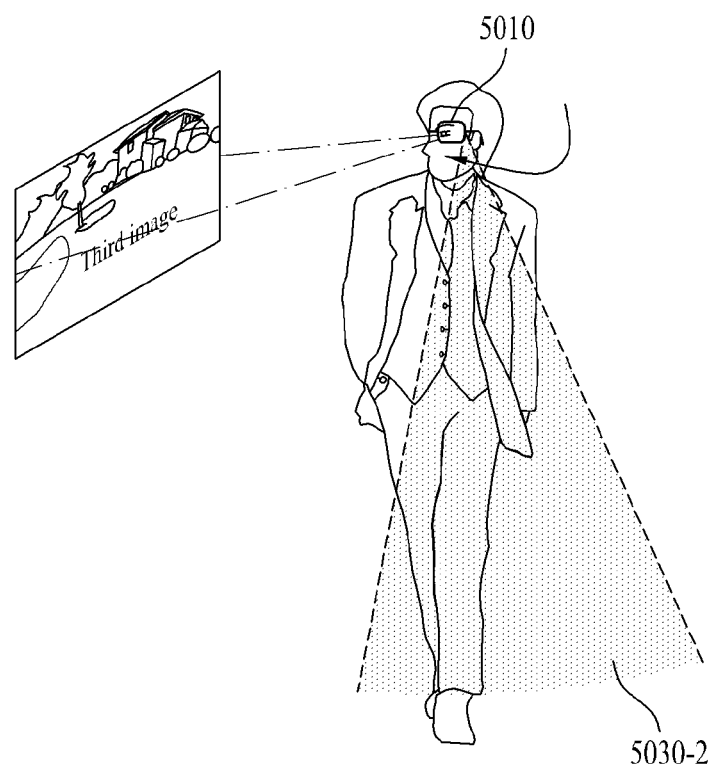

FIG. 5B is a view illustrating the HMD detecting the front direction of the HMD using the second reference image according to one embodiment.

When the second reference image 5020 is set through the embodiment described with relation to FIG. 5A, the HMD 5010 may detect the front direction of the HMD 5010 by matching the second reference image 5020 with a circumjacent image 5030-1, 5030-2 in real time. More specifically, the HMD 5010 may acquire a circumjacent image 5030-1, 5030-2 using at least one sensor included in the second sensor group, and compare the acquired circumjacent image 5030-1, 5030-2 with the second reference image 5020. Alternatively, the HMD 5010 may compare the acquired circumjacent image 5030-1, 5030-2 with the second reference image 5020 for predetermined time intervals. The HMD 5010 may detect the mutual matching sections of the second reference image 5020 and the circumjacent image 5030-1, 5030-2, the position of the matching sections and/or the degree of matching, thereby detecting the direction in which the front of the HMD 5010 faces.

For example, in the case that a section of the circumjacent image 5030-1 detected in real time matches a left section of the second reference image 5020, the HMD 5010 may detect that the front of the HMD 5010 has rotated leftward. In the case that a section of the circumjacent image 5030-2 detected in real time matches a right section of the second reference image 5020, the HMD 5010 may detect that the front of the HMD 5010 has rotated rightward. In this case, the HMD 5010 may display an image in the surrounding image corresponding to the detected direction.

In the case that an image of the user's body is set as the second reference image 5020, a variable image section (not shown) of the second reference image 5020 which is changeable. For example, an image captured in the downward direction of the HMD 5010 is set as the second reference image 5020, the HMD 5010 may detect the image other than the image of the user's body as the variable image. Upon detecting the variable image, the HMD 5010 may match the second reference image 5020 other than the section of the variable image with the circumjacent image. A relevant detailed description has been given above with reference to FIG. 4B.

Figure 6A:
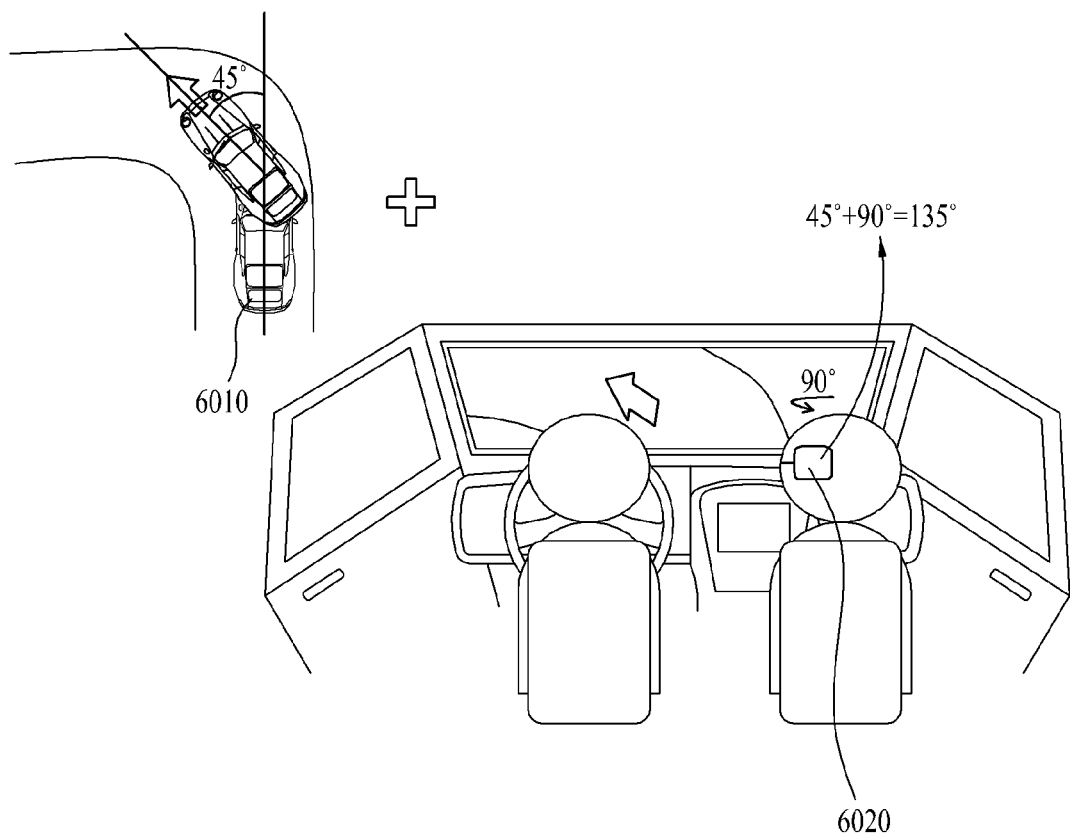
FIGS. 6A and 6B are views illustrating the HMD correcting the first sensing information and detecting the front direction thereof using the corrected first sensing information and the second sensing information according to one embodiment.
Figure 6B:
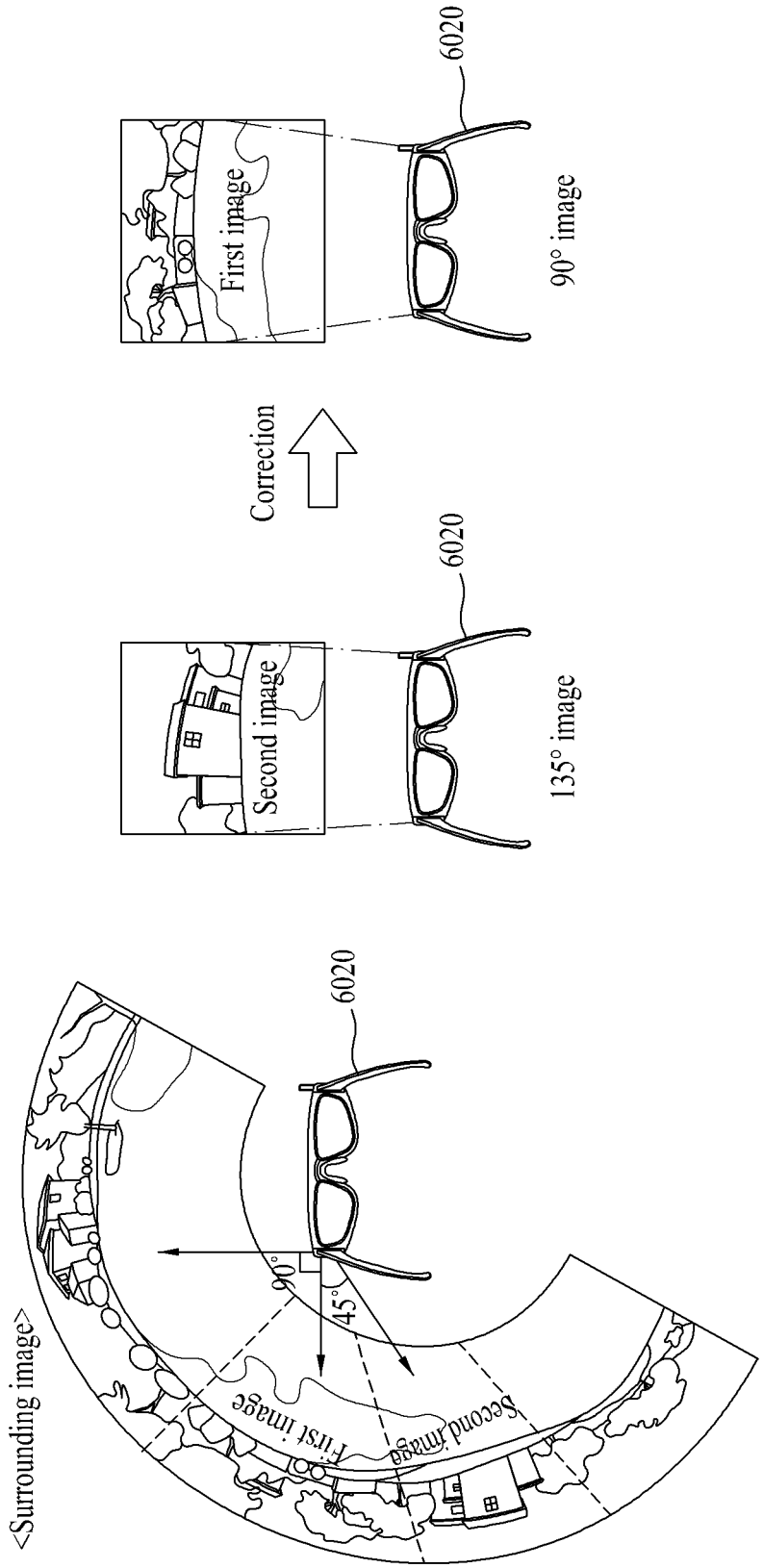

FIGS. 6A and 6B are views illustrating the HMD correcting the first sensing information and detecting the front direction thereof using the corrected first sensing information and the second sensing information according to one embodiment.

As shown in FIG. 6A, the user wearing the HMD 6020 may ride in a means of transportation 6010. At this time, the user's head may rotate at the same time as the means of transportation 6010 rotates. In the case that the HMD 6020 detects the front direction of the HMD 6020 using the first sensing information which has not been corrected, there may be a certain error between the detected front direction of the HMD 6020 and the actual direction of the user's head. That is, in the case that the first sensing information is used without being corrected, the HMD 6020 may acquire, as the first sensing information, information including both the degree of rotation of the means of transportation and the degree of rotation of the user's head, using the first sensor group. More specifically, in this case, the HMD 6020 may acquire, as the first sensing information, information combining the degree of rotation of the means of transportation 6010 and the degree of rotation of the user's head, using the first sensing group.

For example, as shown in FIG. 6A, in the cast that the car 6010 on which the user rides turns left by 45° and the user rotates the head 90° leftward, the HMD 6020 may detect that the front of the HMD 6020 has rotated 135° leftward. That is, in the case that the front direction of the HMD 6020 is detected using only the first sensor group, the information combining the degree of rotation of the car 6010 and the degree of rotation of the user's head may be acquired as the first sensing information. However, the actual degree of rotation of the user's head corresponds to 90°, the sensing information detected by the HMD 6020 has an error. Accordingly, there is a need to correct the first sensing information. Hereinafter, a detailed description will be given of an embodiment in which the HMD 6020 corrects the first sensing information and detects the direction in which the front of the HMD 6020 faces using both the corrected first sensing information and the second sensing information.

According to one embodiment, the HMD 6020 may perform communication with an external device 6010 using a communication unit and correct the first sensing information using the information received from the external device 6010. Herein, the external device 6010 may be a means of transportation 6010 which is capable of conducting communication. For example, the external device 6010 may be a car, an aircraft, a train, a bicycle, and a motorcycle which are capable of conducting communication.

When the HMD 6020 detects the moving state of the HMD 6020, it may activate the first sensor group and the second sensor group or maintain activation of the first sensor group and the second sensor group. The HMD 6020 may acquire the first sensing information and the second sensing information using the activated first sensor group and the activated second sensor group respectively. Then, the HMD 6020 may correct the acquired first sensing information using information received from the external device 6010. More specifically, the HMD 6020 may receive, using a communication unit, third sensing information sensed by the external device 6010 according to change of the absolute position of the external device 6010, and correct the first sensing information using the received third sensing information. Herein, the third sensing information may represent the travel information about the external device 6010.

For example, in the case that the car turns left by 45° and the user rotates the head 90° leftward, the HMD 6020 may acquire, as the first sensing information, information indicating that the front of the HMD 6020 has rotated 135° leftward. At this time, the HMD 6020 may receive, as the third sensing information, the information indicating left turn of the car by 45° from the car 6010, using the communication unit. The HMD 6020 may correct the first sensing information using the received third sensing information. More specifically, the HMD 6020 may correct the detected sensing value of 135° by the received sensing value of 45°. Accordingly, the HMD 6020 may detect that the front of the HMD 6020 has rotated leftward by 90°, not 135°.

According to another embodiment, the HMD 6020 may correct the first sensing information using the acquired second sensing information.

The HMD 6020 may detect the front direction of the HMD 6020 using the corrected first sensing information and the second sensing information. In using the second sensing information, the method as described above with reference to FIGS. 4A to 5B or a method similar thereto may be applied. The HMD 6020 may display an image of a section of a surrounding image corresponding to the detected front direction of the HMD 6020.

FIG. 7 is a flowchart illustrating a method of controlling the HMD. In the flowchart, constituents similar or identical to those illustrated in FIGS. 1 to 6 will be not described in detail.

First, the HMD may detect the state of the HMD (S7010). Herein, the state of the HMD may include a static state and a moving state. The static state of the HMD may represent a state in which the absolute position of the HMD does not change. The moving state of the HMD may represent a state in which the absolute position of the HMD changes. More specifically, the static state may represent a state in which the absolute position of the HMD does not substantially change and the moving state may represent a state in which the absolute position of the HMD substantially changes. The HMD may detect the state of the HMD using a first sensor group and/or a second sensor group, which has been described above in detail with reference to FIG. 2.

In the case that the HMD detects the state of the HMD as the static state, the HMD may detect the direction in which the front of the HMD faces based on the first sensing information or based on the first sensing information and the second sensing information (S7020). In other words, in the case that the HMD detects the static state, the HMD may detect the direction in which the front of the HMD faces, based on the first sensing information. Herein, the first sensing information may represent sensing information acquired from an activated first sensor group. Alternatively, in the case that the HMD detects the static state, the HMD may detect the direction in which the front of the HMD faces, based on the first sensing information and the second sensing information. Herein, the second sensing information may represent sensing information acquired from an activated second sensor group. For example, in the case that the first sensing information is used to detect the front direction, the HMD may detect the direction and degree of rotation of the HMD using a gyro sensor included in the first sensor group, thereby detecting the front direction of the HMD. Alternatively, in the case that the second sensing information is used to detect the front direction, the HMD may process a circumjacent image of the HMD using a camera sensor included in the second sensor group, thereby detecting the front direction of the HMD. A detailed description has been given above with reference to FIG. 2.

On the other hand, in the case that the HMD detects the moving state as the state of the HMD, the HMD may detect the direction in which the front of the HMD faces based on the second sensing information or on the second sensing information and the corrected first sensing information (S7030). In other words, in the case that the moving state of the HMD is detected, the HMD may detect the direction in which the front of the HMD faces based on the second sensing information. In this case, the HMD may set a first reference image in a first direction or a second reference image in a second direction, and match the set first reference image or second reference image with a circumjacent image, thereby detecting the front direction of the HMD. Herein, the first reference image and second reference image may be set depending upon whether the space in which the HMD in the moving state is placed is a closed space or an open space, which has been described above in detail with reference to FIGS. 4A to 5B. Alternatively, in the case that the moving state of the HMD is detected, the HMD may detect the direction in which the front of the HMD faces based on the second sensing information and the corrected first sensing information. In this case, the HMD may receive third sensing information sensed by an external device according to change of the absolute position of the external device, and correct the first sensing information using the received third sensing information. At this time, the HMD may use a communication unit capable of performing communication with the external device. A detailed description has been given above with reference to FIG. 6B.

Next, the HMD may display an image of a section of the surrounding image corresponding to the front direction of the HMD detected in a previous step (S7020 or S7030) (S7040). Herein, the surrounding image may represent an unfolded image shown in all directions (e.g., front, rear, left, right, up and down directions) around the HMD. In the case that the HMD detects that the front direction of the HMD is the first direction, the HMD may detect a first image corresponding to the first direction. Thereby, the HMD may enable the user wearing the HMD to feel present in a virtual space provided by the surrounding image.

Although descriptions have been given for the respective drawings for ease of illustration, embodiments illustrated in the drawings may also be combined to implement a new embodiment. The scope of the present disclosure also covers designing a recording medium readable by a computer having a program recorded to execute the described embodiments, as desired by those skilled in the art.

In addition, the HMD and a control method for the same according to the present disclosure are not limited to the described embodiments. Parts or all of the above embodiments can be selectively combined to produce various variations.

As is apparent from the above description, the present disclosure has effects as follows.

According to one embodiment, activation of sensor groups is controlled according to the state of the HMD to detect the front direction of the HMD. Accordingly, rotation of the user's head may be detected more accurately and the possibility of incorrect operation of the HMD may be lowered.

According to another embodiment, the HMD activates all the sensor groups for detection of the front direction of the HMD in the case that the HMD is in the static state. Accordingly, change of the front direction of the HMD may be detected more accurately and quickly.

According to another embodiment, the HMD sets a reference image and compare the set reference image with circumjacent images in real time. Accordingly, rotation of the user's head with respect to the user's body may be detected more accurately.

According to another embodiment, the HMD receives travel information from an external device to correct sensing information. Accordingly, the sensing information may be corrected more accurately and thus the possibility of incorrect operation of the HMD may be lowered.

Details of the effects have been disclosed in the descriptions given above.

It will be apparent to those skilled in the art that various modifications and variations can be made in the present disclosure without departing from the spirit or scope of the present disclosure. Thus, the present invention is intended to cover the modifications and variations of this disclosure provided they come within the scope of the appended claims and their equivalents. The variations should not be separately understood from the spirit or prospect of the present disclosure.

In addition, the HMD and a control method for the same in the present disclosure may be implemented, as code readable by a processor provided to a network device, in a recording medium readable by the processor. The recording medium readable by the processor includes all kinds of recording devices configured to store data readable by the processor. Examples of the recording medium readable by the processor include ROMs, RAMs, magnetic tapes, floppy disks, and optical data storage devices. Examples also include implementation in the form of a carrier wave such as transmission over the Internet. In addition, the recording medium readable by the processor may be distributed to computer systems connected over a network, and thus code readable by the processor may be stored and executed in a distributed manner.

In addition, in the present disclosure, the rotation angle and direction may not only represent accurate values, but also include a substantial rotation angle and direction within a certain range. That is, the rotation angle and direction of the present disclosure may represent a substantial rotation angle and direction within a certain error range.

In this specification, both a product invention and a method invention have been described. The descriptions thereof may be supplementarily applicable, when necessary.

What is claimed is:

1. A head mounted display (HMD) configured to provide a surrounding image, the HMD comprising:
a display unit configured to display a section of the surrounding image corresponding to a front direction of the HMD;
a first sensor group comprising at least one sensor configured to sense a motion of the HMD;
a second sensor group comprising at least one sensor providing the HMD to capture a circumjacent image; and
a processor configured to control the display unit, the first sensor group and the second sensor group to acquire first sensing information from the first sensor group and second sensing information from the second sensor group,
wherein the processor is further configured to:
detect a state of the HMD using at least one of the first sensing information and the second sensing information, the state of the HMD comprising a static state in which an absolute position of the HMD does not change and a moving state in which the absolute position changes;
detect, when the state of the HMD is detected as the static state, a direction in which a front of the HMD faces based on the first sensing information or based on the first sensing information and the second sensing information;
detect, when the state of the HMD is detected as the moving state, the direction in which the front of the HMD faces based on the second sensing information or based on the second sensing information and corrected first sensing information; and
display an image of a section of the surrounding image corresponding to the detected direction,
wherein, in detecting the direction in which the front of the HMD faces based on the second sensing information and the corrected first sensing information, the processor is further configured to:
correct the acquired first sensing information; and
detect the direction in which the front of the HMD faces using the corrected first sensing information and the second sensing information.

2. The HMD according to claim 1, wherein the absolute position of the HMD does not substantially change in the static state, but substantially changes in the moving state.

3. The HMD according to claim 1, wherein the processor is further configured to:
detect the state of the HMD as the static state when the absolute position of the HMD changes by a distance less than or equal to a threshold distance for a predetermined time; and
detect the state of the HMD as the moving state when the absolute position of the HMD changes by a distance exceeding the threshold distance for the predetermined time.

4. The HMD according to claim 1, wherein, when detecting the state of the HMD using the first sensing information, the processor is further configured to acquire the absolute position of the HMD as the first sensing information using a global positioning system (GPS) sensor belonging to the first sensor group, and detects the state of the HMD based on the acquired first sensing information.

5. The HMD according to claim 1, wherein, when detecting the state of the HMD using the second sensing information, the processor is further configured to capture the circumjacent image as the second sensing information using the second sensor group, process the captured circumjacent image, and detect change of the absolute position of the HMD based on a result of the processing.

6. The HMD according to claim 1, further comprising a communication unit configured to transmit and receive information with an external device,
wherein the processor is further configured to:
acquire travel information of the external device using the communication unit,
detect change of the absolute position of the HMD using the acquired travel information, and
detect the state of the HMD based on the detected change of the absolute position of the HMD.

7. The HMD according to claim 6, wherein the external device comprises a means of transportation allowing a user to ride therein.

8. The HMD according to claim 1, wherein, when the state of the HMD is detected as the moving state, and only the second sensing information is used to detect the direction in which the front of the HMD faces, the processor is further configured to:
deactivate the first sensor group, and
activate the second sensor group or maintain activation of the second sensor group.

9. The HMD according to claim 8, wherein, when the state of the HMD is detected as the moving state, the processor is further configured to additionally detect whether a space containing the HMD is an open space or a closed space using the activated second sensor group.

10. The HMD according to claim 9, wherein the processor is further configured to:
capture the circumjacent image of the HMD as the second sensing information using the activated second sensor group;
detect the space containing the HMD as the closed space when the captured circumjacent image matches a predetermined image; and
detect the space containing the HMD as the open space when the captured circumjacent image does not match the predetermined image.

11. The HMD according to claim 9, wherein the processor is further configured to:
set a first reference image using the activated second sensor group upon detecting that the space containing the HMD is the closed space; and
set a second reference image using the activated second sensor group upon detecting that the space containing the HMD is the open space.

12. The HMD according to claim 11, wherein the processor further configured to:
upon detecting that the space containing the HMD is the closed space, capture an image in a first direction using the activated second sensor group and set the captured image in the first direction as the first reference image; and
upon detecting that the space containing the HMD is the open space, capture an image in a second direction using the activated second sensor group and set the captured image in the second direction as the second reference image.

13. The HMD according to claim 11, wherein the first reference image comprises an internal image of the space containing the HMD and the second reference image comprises a body image of a user wearing the HMD.

14. The HMD according to claim 11, wherein, upon setting the first reference image or the second reference image, the processor is further configured to:

capture the circumjacent image of the HMD as the second sensing information in real time using the activated second sensor group;

detect the direction in which the front of the HMD faces by comparing the captured circumjacent image with the first reference image or the second reference image; and display an image of a section of the circumjacent image corresponding to the detected direction.

15. The HMD according claim 1, further comprising a communication unit configured to transmit and receive information with an external device, wherein, in correcting the first sensing information, the processor is further configured to:

receive, using the communication unit, third sensing information sensed by the external device according to change of an absolute position of the external device; and correct the first sensing information using the received third sensing information.

16. The HMD according to claim 1, wherein the first sensor group comprises at least one of an acceleration sensor, a gyro sensor, a geomagnetic sensor, a global positioning system (GPS) sensor, a pressure sensor, an elevation sensor and a proximity sensor.

17. The HMD according to claim 1, wherein the second sensor group comprises at least one of a camera sensor, an infrared sensor and a proximity sensor.

18. A method for controlling a head mounted display (HMD) configured to provide a surrounding image, the method comprising:

detecting a state of the HMD using at least one of first sensing information acquired from a first sensor group comprising at least one sensor configured to sense motion of the HMD and second sensing information acquired from a second sensor group comprising at least one sensor configured to capture a circumjacent image, the state of the HMD comprising a static state in which an absolute position of the HMD does not change and a moving state in which the absolute position changes;

detecting, when the state of the HMD is detected as the static state, a direction in which a front of the HMD faces based on the first sensing information or based on the first sensing information and the second sensing information detecting, when the state of the HMD is detected as the moving state, the direction in which the front of the HMD faces based on the second sensing information or based on the second sensing information and corrected first sensing information; and displaying an image of a section of the surrounding image corresponding to the detected direction, wherein, in detecting the direction in which the front of the HMD faces based on the second sensing information and the corrected first sensing information, the method further comprises:

correcting the acquired first sensing information; and detecting the direction in which the front of the HMD faces using the corrected first sensing information and the second sensing information.

19. The method according to claim 18, wherein the detecting of the state of the HMD comprises:

detecting the state of the HMD as the static state when the absolute position of the HMD changes by a distance less than or equal to a threshold distance for a predetermined time; and detecting the state of the HMD as the moving state when the absolute position of the HMD changes by a distance exceeding the threshold distance for the predetermined time.

* * * * *